(12) United States Patent
Markham et al.

(10) Patent No.: US 7,173,534 B1
(45) Date of Patent: Feb. 6, 2007

(54) BIRD CONTROL SYSTEM

(76) Inventors: Robert W. Markham, 725 N. Nyesville Rd., Rockville, IN (US) 47872; Patrick W. Thomas, 10300 S. 75 West, Clinton, IN (US) 47842

( * ) Notice: Subject to any disclaimer, the term of this patent is extended or adjusted under 35 U.S.C. 154(b) by 0 days.

(21) Appl. No.: 10/888,569

(22) Filed: Jul. 9, 2004

Related U.S. Application Data

(60) Provisional application No. 60/486,635, filed on Jul. 11, 2003, now abandoned.

(51) Int. Cl.
*G08B 23/00* (2006.01)

(52) U.S. Cl. .............................. 340/573.2; 340/691.2; 340/309.16; 340/328; 340/384.2; 340/384.5

(58) Field of Classification Search ............. 340/573.2, 340/691.1, 691.2, 309.16, 309.2, 309.3, 328, 340/329, 384.2, 384.5, 392.1; 119/713
See application file for complete search history.

(56) References Cited

U.S. PATENT DOCUMENTS

| | | | |
|---|---|---|---|
| 4,074,245 A * | 2/1978 | Podany ....................... | 340/654 |
| 4,284,845 A | 8/1981 | Belcher | |
| 4,414,653 A | 11/1983 | Pettinger | |
| 4,658,386 A | 4/1987 | Morris | |
| 4,742,328 A * | 5/1988 | Arai et al. ................... | 340/326 |
| 4,769,794 A | 9/1988 | Beuter et al. | |
| 4,965,552 A | 10/1990 | Price et al. | |
| 5,208,787 A | 5/1993 | Shirley | |
| 5,214,411 A | 5/1993 | Herbruck | |
| 5,450,063 A | 9/1995 | Peterson et al. | |
| 5,986,551 A * | 11/1999 | Pueyo et al. ............. | 340/573.1 |
| 6,016,100 A | 1/2000 | Boyd et al. | |

(Continued)

OTHER PUBLICATIONS

VIBCO Product Application Bulletin, Hoppers, [online], undated, [retrieved Jun. 30, 2006] Retrieved from the Internet: <http://www.vibco.com/pdfs/pab/0427PAB.pdf>.

(Continued)

*Primary Examiner*—Daryl C Pope
(74) *Attorney, Agent, or Firm*—William F. Bahret; P. Derek Pressley

(57) ABSTRACT

A computer based bird control system is provided. The bird control system utilizes an impactor that is attachable to a structure, such as an I-beam or other similarly sized and dimensioned metal object, to create an acoustic impact noise similar to a whacking of the structure. The impactor is preferably actuated at a random or a semi-random impact rate such as around once every ten seconds. The acoustic impact noise may be provided in addition to the playing of bird predator or other deterrent sounds maintained in audio files on the computer. The system also provides audio and/or physical bird presence detection within a monitored area. Detection of the presence of a bird may be used as a trigger for the actuation of the impactor and/or predator/deterrent sounds. Actuation of the impactor and/or sound files may be accomplished via a schedule through the use of timer files in addition to or in place of animal presence detection. A graphical user interface of the system provides user control of the system including the ability to set and/or modify system parameters such as those that can detect particular bird species via audio detection, as well as the manipulation of timer file parameters for automatic or forced activation of the impactor and/or sound files.

17 Claims, 10 Drawing Sheets

U.S. PATENT DOCUMENTS

| | | | |
|---|---|---|---|
| 6,250,255 B1 | 6/2001 | Lenhardt et al. | |
| 6,285,630 B1 * | 9/2001 | Jan | 367/139 |
| 6,351,908 B1 * | 3/2002 | Thomas | 43/1 |
| 6,396,402 B1 * | 5/2002 | Berger et al. | 340/573.2 |
| 6,742,470 B2 * | 6/2004 | Keithly | 116/22 A |
| 6,750,388 B2 * | 6/2004 | McKasah | 84/600 |
| 6,814,021 B1 * | 11/2004 | Turkewitz et al. | 116/22 A |
| 6,863,012 B2 * | 3/2005 | Levin | 114/221 R |

OTHER PUBLICATIONS

VIBCO Product Application Bulletin, Feeder, [online], undated [retrieved on Aug. 17, 2004]. Retrieved from the Internet: <http://www.vibco.com/pdfs/FEEDER_Eggs_SCR-60_Adjustable_Electric_Vibrator.pdf>.

VIBCO Product Application Bulletin, Railroad Car Shaker, [online], undated, [retrieved on Aug. 17, 2004] Retreived from the Internet: <http://www.vibco.com/pdfs/RRCarShaker_CCW-5000_Rotary_Piston_Vibrator.pdf>.

Martin Engineering, Martin® Thumper® timed Impactors, [online], c. 2004 [retrieved on Dec. 9, 2004]. Retrieved from the Internet: <http://www.martin-eng.com/products.php?product=32>.

VIBCO Product Catalog, Electric Vibrators Adjustable Speed & Force, [online], undated, [retrieved May 8, 2006] Retrieved from the Internet: <http://www.vibco.com/pdfs/electric_adj_vib.pdf>.

\* cited by examiner

BIRD CONTROL SYSTEM

This application claims the benefit of U.S. Provisional Patent Application Ser. No. 60/486,635, filed Jul. 11, 2003 now abandoned, entitled Audio Bird Deterrent Software and Unit, which application is hereby incorporated in its entirety by reference.

BACKGROUND OF THE INVENTION

1. Field of the Invention

This invention relates generally to devices for deterring pests and, more particularly, to a system and method for deterring animals such as birds.

2. Background of the Invention

Various animals such as rodents and/or birds are, in some situations, considered pests that need to be deterred from being in or from a particular area. In view of this, the prior art is replete with devices for deterring or expelling animals from an area. These devices typically utilize a monitoring device such as a motion sensor to actuate a repellent such as a sound or a visual display. The sound or visual display is designed to either evoke panic or fear in the animal or to create an unpleasant sensation in the animal. Animal repellant devices of the prior art typically rely upon periodic generation of noises or sounds that thus have the tendency to frighten the animals in order to deter or expel them from the monitored area.

With respect to the sound deterrent/expulsion devices, most of these devices utilize sound waves having frequencies that are considered offensive to the animal, such as ultrasonic frequencies which are at frequencies that are above the range of human hearing. The offensive sounds thus drive off the animal from the affected area. Typically, animal deterrent systems incorporating an ultrasonic deterrent utilize a single frequency. While the selected frequency is chosen to have a deterrent effect, the constant frequency can fail to get the attention of the animal. Furthermore, the use of a single frequency does not contemplate variations in the hearing capabilities of the animals, potentially limiting the effectiveness of the animal deterrent system. As such, prior art devices have been developed that generate varying-frequency ultrasonic emissions.

Other prior art animal repellent/expulsion devices utilize different tactics. For instance, in U.S. Pat. No. 5,208,787 low frequency vibrations are used to induce animals to leave a particular area. Indirect structure coupling of the vibrations to buildings, earth ground rods, and water/gas pipes carrying the vibrations. The vibrations, however, do not produce audible noises in or from the structure to which it is attached.

Still other prior art animal repellant/expulsion systems use ultrasonic, supersonic, microwave, screeching and/or oscillated screeching with limited success (see e.g. U.S. Pat. Nos. 4,284,845; 4,658,386; 4,965,522; 5,208,787; 5,214,411; 6,016,100 and 6,250,255). Additionally, these sounds are also annoying or undesirable to humans in the area of intended animal eradication. This can lead to human interference in defeating an installed system.

It is noted that most, if not all, of the prior art animal repellant devices such as have been described above do not produce audible noises from the structure, but rather from audio devices or files. Furthermore, such prior art devices are not designed to specifically repel, expel or prevent animals such as birds from landing on or nesting upon certain outdoor structures. Outdoor structures such as oil refineries, chemical plants, electrical substations and the like that have components or equipment that are open to animal and/or bird infestation are easily susceptible to damage from such animal and/or bird infestation. Still further, these animal repellant/expulsion device are not computer controlled and therefore lack the ability to allow a user to manipulate the system and/or alter the parameters thereof.

Moreover, the prior art animal repellant/expulsion devices are discrete systems that cannot take advantage of current computer capabilities. As such, prior art animal repellant/expulsion devices do not provide for easy modification of system parameters, if at all.

What is therefore needed in view of the above is a computer implemented bird repellant/expulsion system.

What is therefore further needed in view of the above is a computer implemented bird repellant/expulsion system that allows easy modification of system parameters.

What is therefore still further needed in view of the above is a bird repellant and/or expulsion system for use with outdoor structures.

What is therefore also needed in view of the above is a bird repellant and/or expulsion system that is operable to generate a deterrent noise from an outdoor structure.

SUMMARY OF THE INVENTION

The present invention is a computer based bird control system. The computer based bird control system is configured to deter, repel, eradicate and/or expel birds from a particular area.

In one form, the present bird control system is a graphical user interface based system that provides user control of system parameters. Such control includes the ability to set and/or modify system parameters such as those that can detect particular bird species via audio detection and provide forced deterrent activation, select and play various audio deterrents, as well as for the manipulation of timer file parameters for automatic activation of the impactor and/or sound files.

In another form, the present bird control system utilizes an impactor, attachable to a metal structure such as an I-beam, to generate an acoustic impact noise in conjunction with the structure similar to a whacking of the structure. The impactor is preferably actuated at a random or a semi-random impact repetition rate such as around once every ten seconds. The system also provides a method for deterring animals through the generation of an acoustic percussion via interplay between an impactor attached to a metal structure. The acoustic impact noise may be provided in addition to the playing of predator or other deterrent sounds maintained in audio files on the computer.

In yet another form, the present bird control system provides audio and/or physical animal presence detection within a monitored area. Detection of the presence of an animal may be used as a trigger for the actuation of the impactor and/or predator/deterrent sounds. Actuation of the impactor and/or sound files may be accomplished via a schedule through the use of timer files in addition to or in place of animal presence detection.

In still yet another form, the present bird control system provides for seasonal adjustment of start times for automatic activation of one or more sound deterrents.

The objects and advantages of the present invention will be more apparent upon reading the following detailed description in conjunction with the accompanying drawings.

BRIEF DESCRIPTION OF THE DRAWINGS

Like reference numerals indicate the same or similar parts throughout the several views.

DETAILED DESCRIPTION OF PREFERRED EMBODIMENTS

Figure 1:
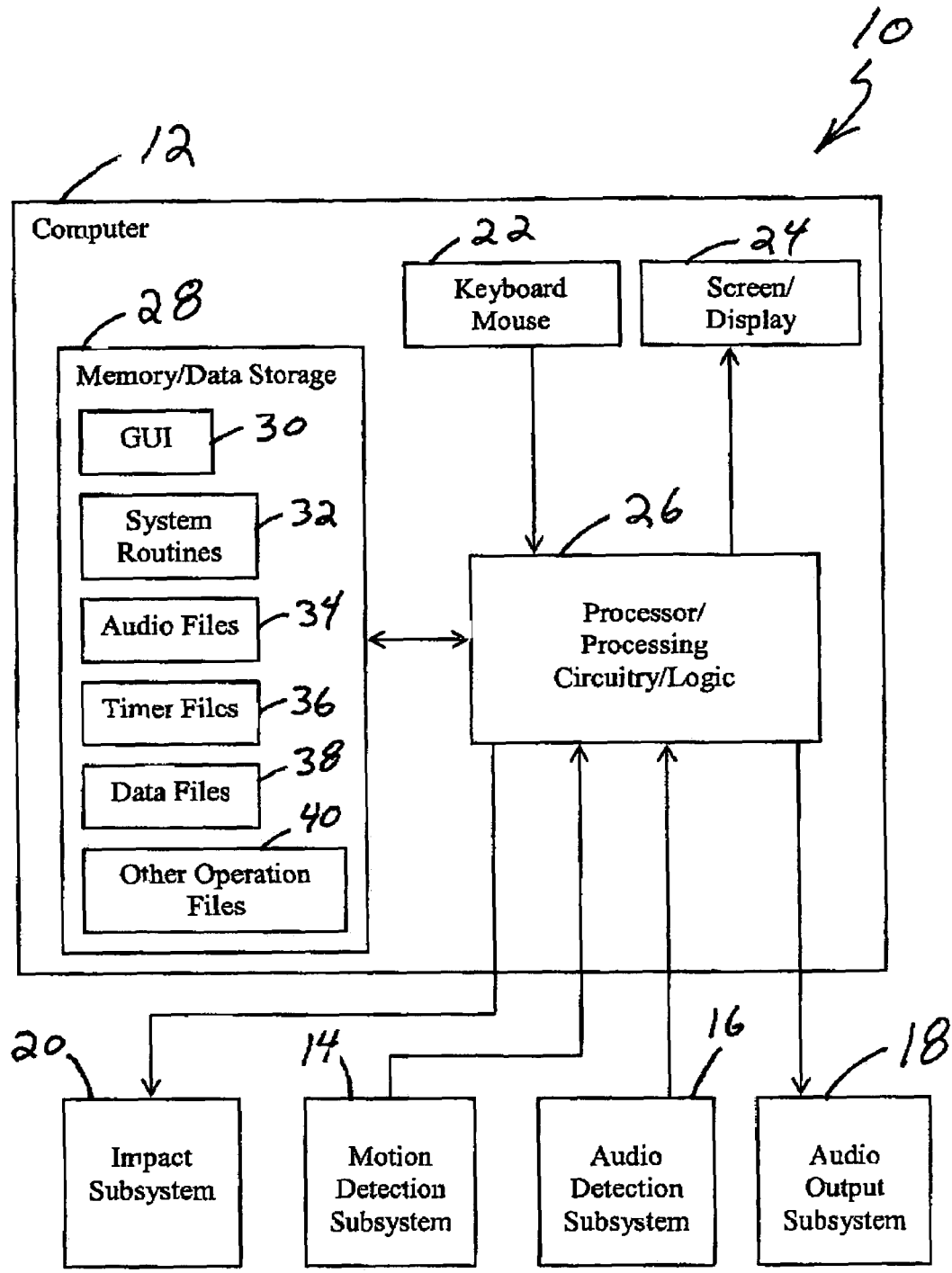
FIG. 1 is a block diagram of an exemplary bird control system in accordance with the principles of the subject invention.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates. Moreover, the present invention is described herein as for the control (deterrence, repellant, eradication and/or expulsion) of animals from a particular area and/or structure. The present system, however, is particularly applicable to birds but may be applicable to other animals such as rodents or otherwise.

FIG. 1 depicts an exemplary block diagram embodiment of an animal control (deterrence, expulsion, repellant, eradication) system generally designated 10 configured in accordance with the principles of the present invention. The animal control system 10 includes a general purpose computer 12 that may be any type of computer, but is preferably a laptop since a laptop has an internal battery that acts as a backup power source should main power be interrupted or not available. The computer 12 is connected to a conventional power source (not shown) and serves as a controller for the animal control system including the various subsystems thereof. The computer 12 is under control of animal deterrent/control software that operates the present system. The term computer also encompasses devices that include computer components operable to carry out the principles of the present invention, even though such devices may not be considered what is typically thought of as a personal computer, laptop or the like.

The animal control system 10 has a motion detection subsystem 14 that is operably coupled to the computer 12 via an I/O port of the computer 12 or the like. The motion detection or physical animal presence detection subsystem 14 may be termed a watcher and is operable to monitor or watch an area via motion sensing or the like for the presence of a bird. The animal deterrent system 10 also has an audio detection subsystem 16 that is operably coupled to the computer 12 via an I/O port of the computer 12 or the like. The audio detection subsystem 16 may be termed a listener and is operable to listen to sounds within a monitored area for the presence of a bird. Moreover, and as explained in greater detail below, the audio detection subsystem 16 is operable to detect the presence of one or more different types of species of animal within an audio detection area.

The animal deterrent system 10 furthermore has an audio output subsystem 18 that is operably coupled to the computer 12 via an I/O port of the computer 12 or the like. The audio output subsystem 18 is operable to emit sound or acoustic energy for the playing of deterrent and/or predator sounds that cause unwanted animals to leave or not enter the monitored area. Still further, the animal control system 10 has an impact subsystem 20 that is operably coupled to the computer 12 via an I/O port of the computer 12 or the like. As explained in greater detail below, the impact subsystem 20 is operable to provide impacts, strikes or hits onto a substantial steel structure to which an impactor of the impact subsystem 20 is mounted in order to create or generate an impaction noise or percussion with the structure.

The computer 12 has a keyboard and/or mouse 22 as input devices in order to accept input from a user. A screen or display 24 is also part of the computer 12. The computer 12 includes a processor and/or processing circuitry/logic 26 such as is known in the art for operation of the computer 12 in a known manner, control of the various systems connected to the computer 12 forming part of the present animal control system 10 as described herein, and control of the various components of the computer 12 in a known manner, some of which are described herein and some of which are not in conjunction with appropriate operating software and the present animal control software. The computer 12 also includes other components such as are known in the art. The operating system for the computer 12 may be any desired operating system.

Moreover, the computer 12 includes memory and/or data storage 28 such as is known in the art for the storage of various program instructions, files and data for the operation of the computer 12 such as is known in the art, for the operation of the computer as is known in the art, and for storage of the animal control software for the operation of the present invention as particularly described herein. The memory/data storage 28 also includes program instructions for a graphical user interface (GUI) 30 and system routines 32 the functions, features and/or operation of which are described in greater detail below that make up part of the animal control software. Moreover, the memory/data storage 28 includes audio or sound files 34, timer files 36, data files 38 and other operation files 40 for operation in conjunction with the present animal control software, the functions, features and/or operation of which are described in greater detail below.

Figure 9:
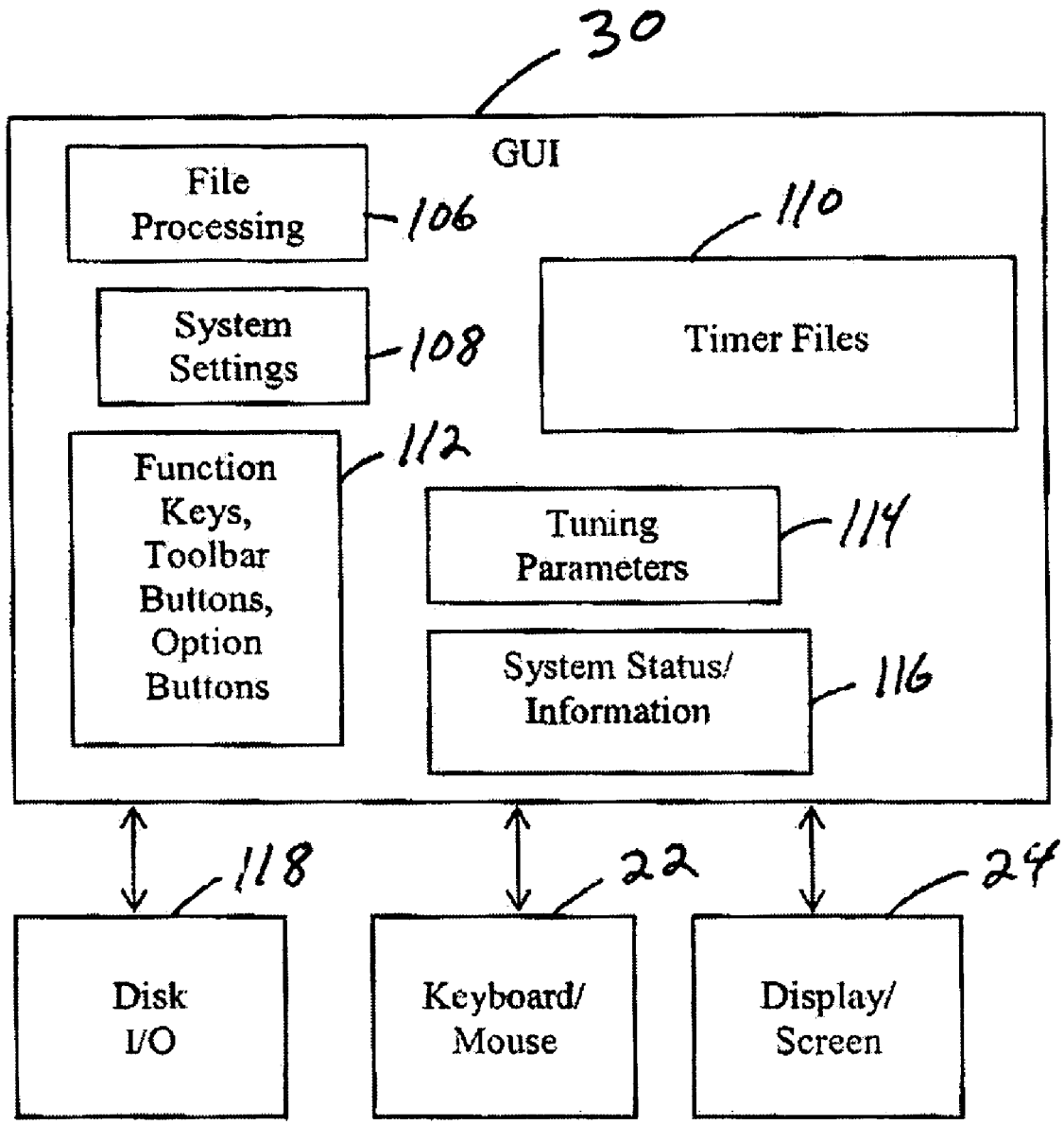
FIG. 9 is a diagrammatic representation of the graphical user interface of the exemplary bird control system of FIG. 1 and operably coupled to various components of the computer of the system.

The GUI 30 is designed to allow easy user access to operating parameters, options, status updates and other data of the present bird deterrent/control system 10 including the modification and setting of system parameters. The present animal control system 10, however, can operate without operator intervention. In FIG. 9, there is depicted a block diagrammatic representation of the various features and/or functions of the GUI 30 that is displayable on the display/screen 24 of the computer 12. The GUI 30 allows user access to system settings 108, timer files (i.e. a file having one or more, and up to an unlimited number depending on system configuration, of timers each one of which is used to activate the various sounds and the impactor at various times of the day). Each timer of a timer file includes a timer number, a start time, a sound duration, and an impact duration if any. In accordance with an aspect of the subject invention, the start time of each timer may be adjusted according to seasonal sunrise and/or sunset changes at the particular place of installation. This allows a timer file that may be configured for a particular species to be used at any installation site.

Figure 10:
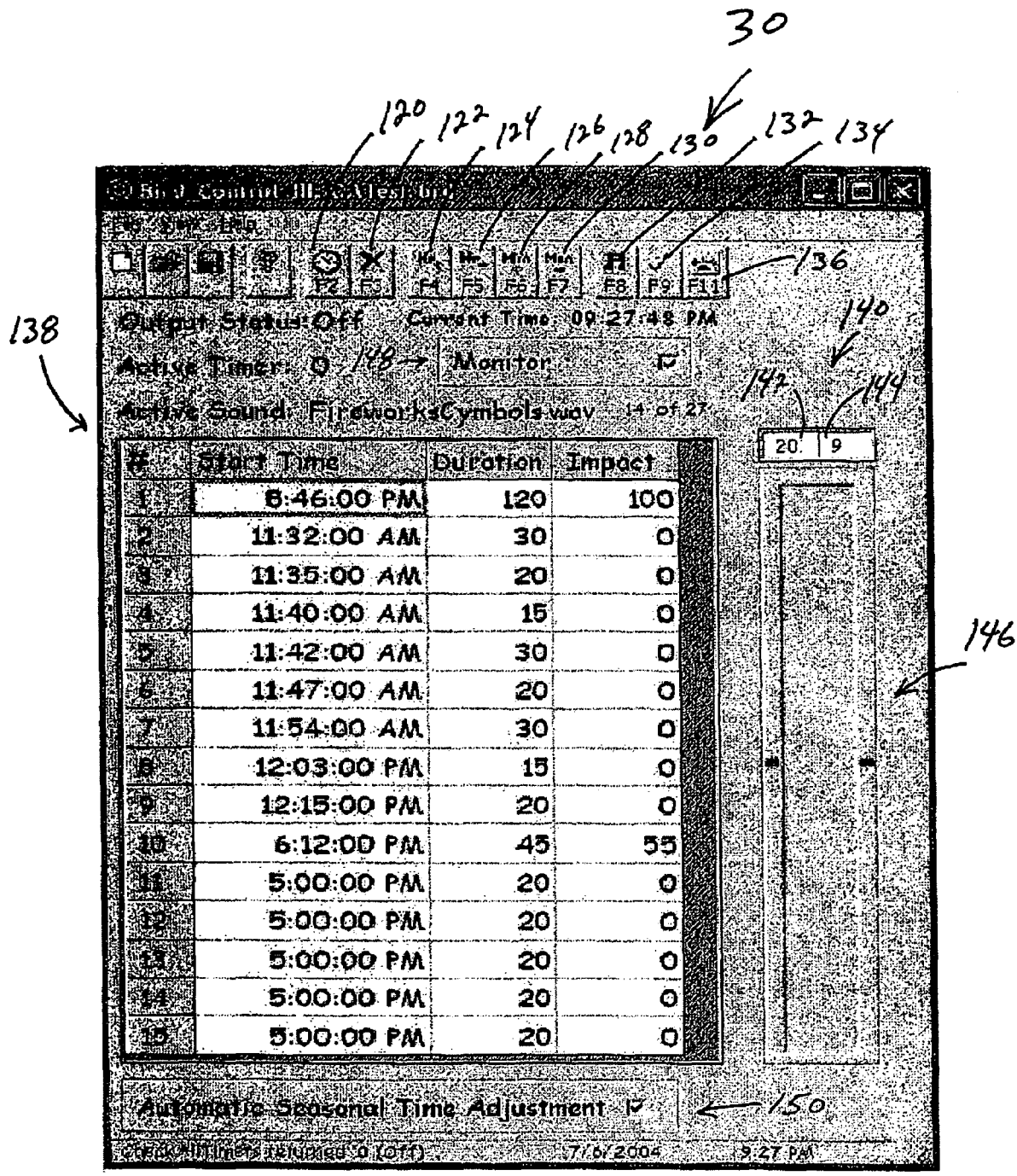
FIG. 10 is a depiction of an exemplary graphical user interface in accordance with the principles of the subject invention.

Additionally, the GUI 30 allows file processing 106 of animal control system files and access to tuning parameters 114 of the listening routine for sound/species detection in accordance with the present principles, as well as the showing of system status/information 116 of the present animal control system 10. Moreover, the GUI 30 provides various function keys, toolbar buttons and option buttons 112 for general use of the various functions and/or features of the GUI 30. The GUI 30 is thus operably connected to disk I/O 118, the keyboard/mouse 22 and the display/screen 24. An exemplary GUI is depicted in FIG. 10, the features, functions and/or operation of which will be described hereinbelow.

With respect to timer files, the system 10 is operable to utilize one or more timer files, either in accordance with a set sequence or in connection with the detection of an animal. Thus, a timer file may be utilized as set by the system (automatic) or an operator (manual), or a particular timer file may be utilized when an animal or a particular animal is detected. A timer file has one or more adjustable parameter timers. Each parameter of each timer of each timer file is adjustable either by the operator via the GUI 30 or by the system 10.

System routines 32 are assorted routines for the general operation of the present animal control system as well as the various subsystems of the present invention. Particularly, the system routines 32 allow operation of motion detection subsystem 14, audio detection subsystem 16, audio output subsystem 18 and impact subsystem 20 all of which are described below in greater detail.

Audio files 34 within the memory/data storage 28 represent one or more audio/sound files that are preferably common sound file format files that allow for digital storage of various sounds. The audio files 34 particularly provide predator and/or animal deterrent sounds that are designed to deter or control animal such as birds. The animal deterrent sounds are distinguished from common industrial noises such as piston action, relief vents, sirens, clanging and the like. The audio files 34 include such sounds as human noises, dogs barking, guns firing, trash can lids banging, a truck backfiring, a helicopter flying, predator sounds, bells ringing and the like (i.e. non-industrial sounds). While these sounds may include such noises as blasts or explosions, the playing of such sound files may be suppressed at particular installation environments (e.g. chemical plant installation). The audio files 34 may be sounds that are aimed at particular species of animal. The audio files 34 may be pure sounds (e.g. recorded sounds) or digitally mixed or produced sounds. The plurality of audio files 34 may be customized for a particular installation environment and/or animal species, such that only a selection of a larger plurality of audio files may be encompassed by the term audio files 34. Moreover, audio files 34 may be optionally recorded at different volume levels effectively varying the perceived volume of the deterrent sound (i.e. a form of random audio file playing). The audio files 34 may be randomly selected for playing in order to prevent the target animal from detecting a pattern which might lead to challenging the system.

Timer files 36 represent one or more system timer files each having various parameters for the control of various subsystems and their associated devices/components. The timer files determine when and/or whether audio files should start playing, the duration of play time, and whether the impactor should also be activated and, if so, the duration of impactor duration. The duration of impactor activation is not necessarily the duration of actuation and, in most cases, is not. Thus, while the impactor may be active (activation), the impactor is only actuated intermittently or at various intervals. Such intervals are not necessarily periodic and may be random or at varying intervals during the activation period of the impactor. Each one of the timer files includes parameters that specify a number associated with the timer file, the time of day that a selected audio file is to play or start ("start time"), its duration of play time (sound duration), impact or activation duration (impactor duration) and may include the particular audio file to play. The number of timer files 36 may be essentially limitless dependent only upon the configuration of the computer 12. While a few timers (i.e. <10) may be adequate, the system 10 preferably includes at least 15–20 timers or more, up to an unlimited number confined only by system configuration. The timer files may be distinguished in the system by the use of a ".brd" extension (i.e. each file is of the format, *.brd). This may distinguish the timer file for use with a bird or may be a general extension. Other extensions may be used for other animals. With the GUI 30, timers can be added, deleted and incremented by minutes and/or hours.

Data files 38 represent one or more data files that are used for operation of the present system 10. Other operation files 40 represent one or more operation files utilized by the present system 10.

Figure 2:
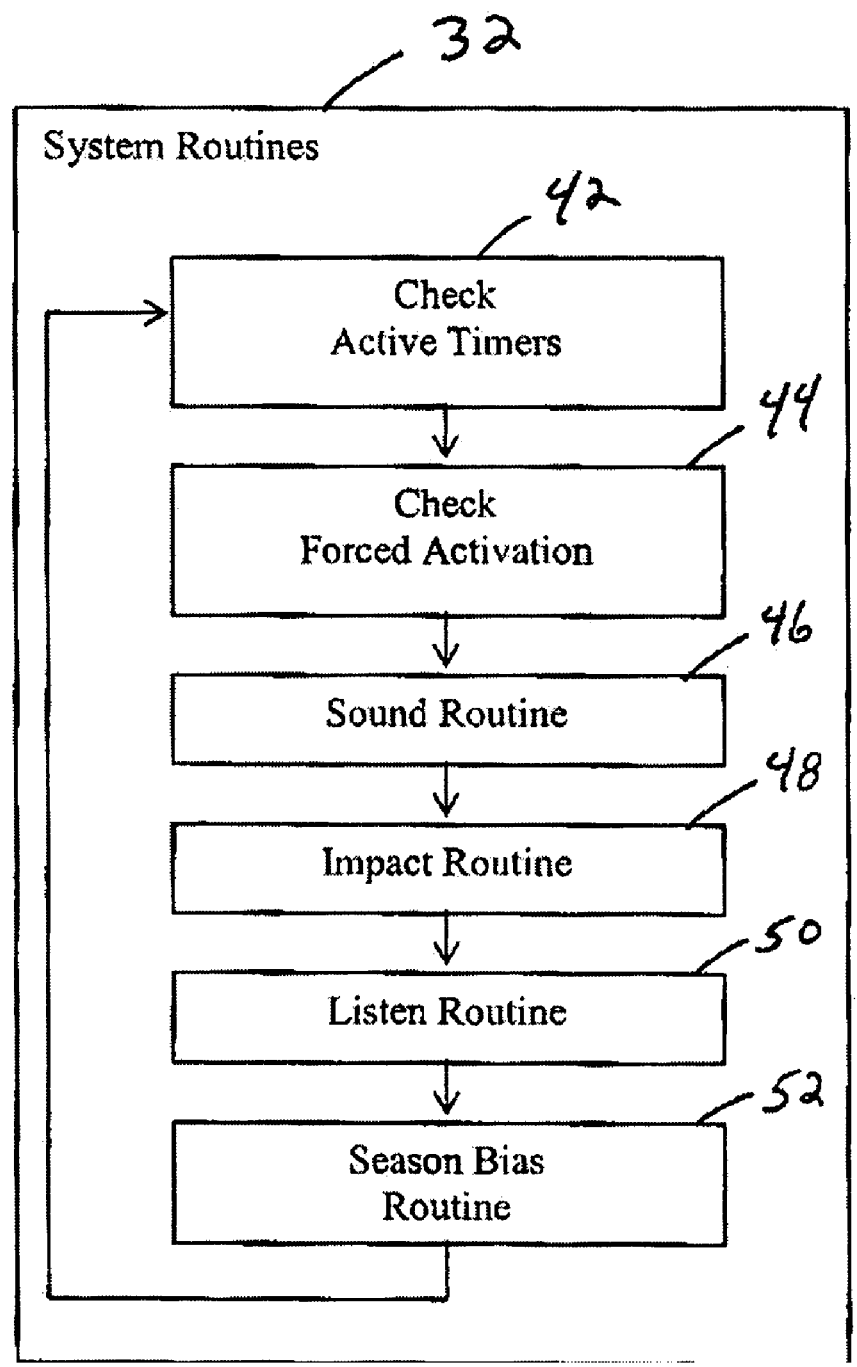
FIG. 2 is a diagrammatic representation of the various system routines for the exemplary bird control system of FIG. 1.

In FIG. 2, the various system routines 32 for the present animal control system 10 are depicted as well as the preferably, but not necessarily, system flow regarding the various routines. It should be appreciated that the present system is preferably, but not necessarily, automated. The system 10 is thus programmed to launch/run files accordingly such as *.brd files (files executable by the system). Thus a startup icon on the computer 12 may be used to launch the present animal control system 10. The following is an explanation of the various system routines 32.

Figure 3:
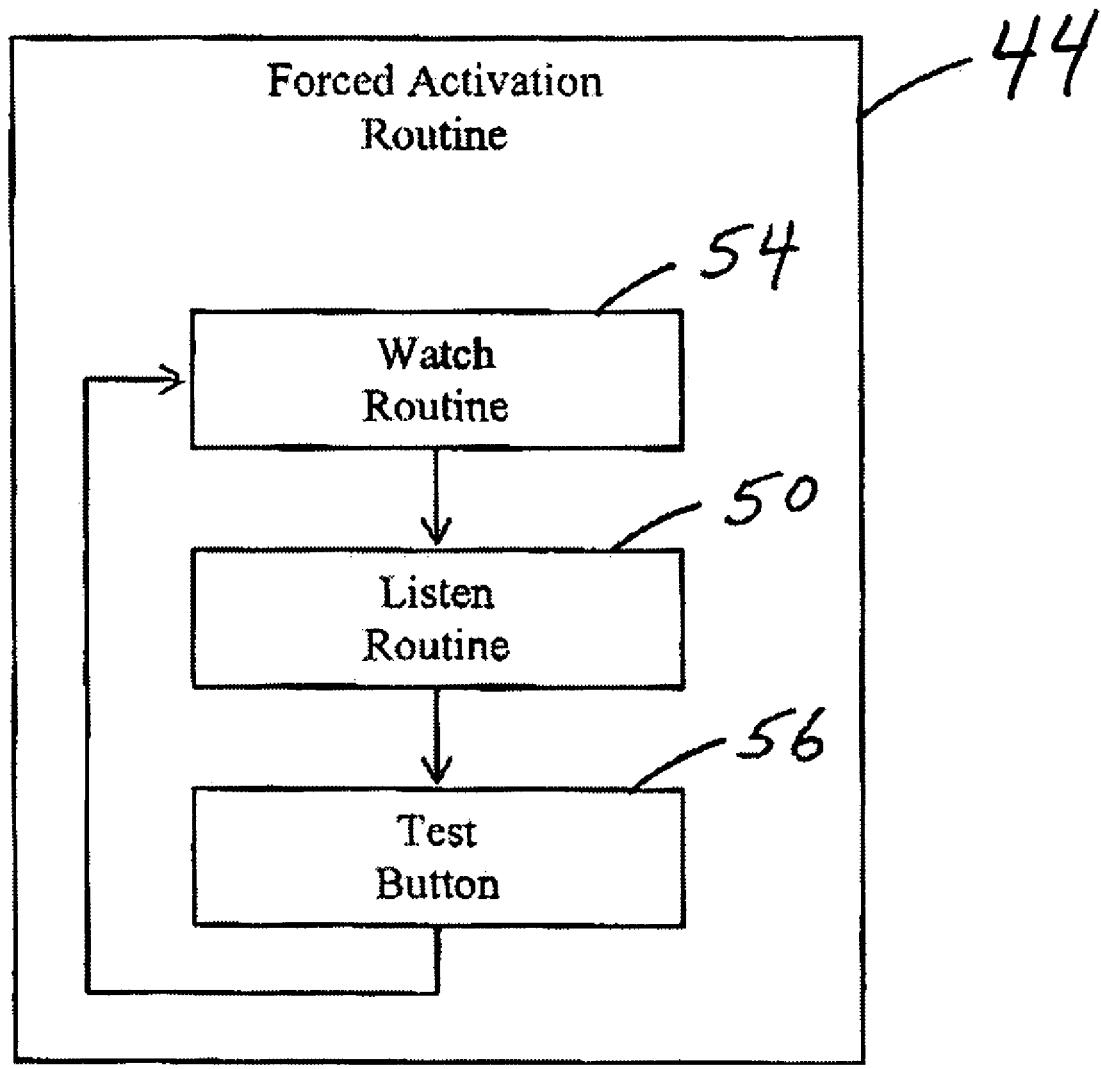
FIG. 3 is a diagrammatic representation of the forced activation routine of the system routines of FIG. 2.

Check active timers routine 42 of the system routines 32 determines if any active timers need to be started and starts them accordingly. Check forced activation 44 checks the system for any forced activations. Particularly, the system determines whether any triggers (motion detection or sound detection) have occurred and activates an appropriate audio file and/or impactor for a predetermined duration. In FIG. 3, the system flow for the forced activation routine 44 is depicted. The forced activation routine 44 includes a watch routine 54, a listen routine 50, and a test button routine 56. Each routine determines whether an associated trigger has occurred and thus forces the system to activate. The test button routine 56 provides an on/off button on the computer 12 to test the selected deterrent sound and/or impactor.

Figure 4:
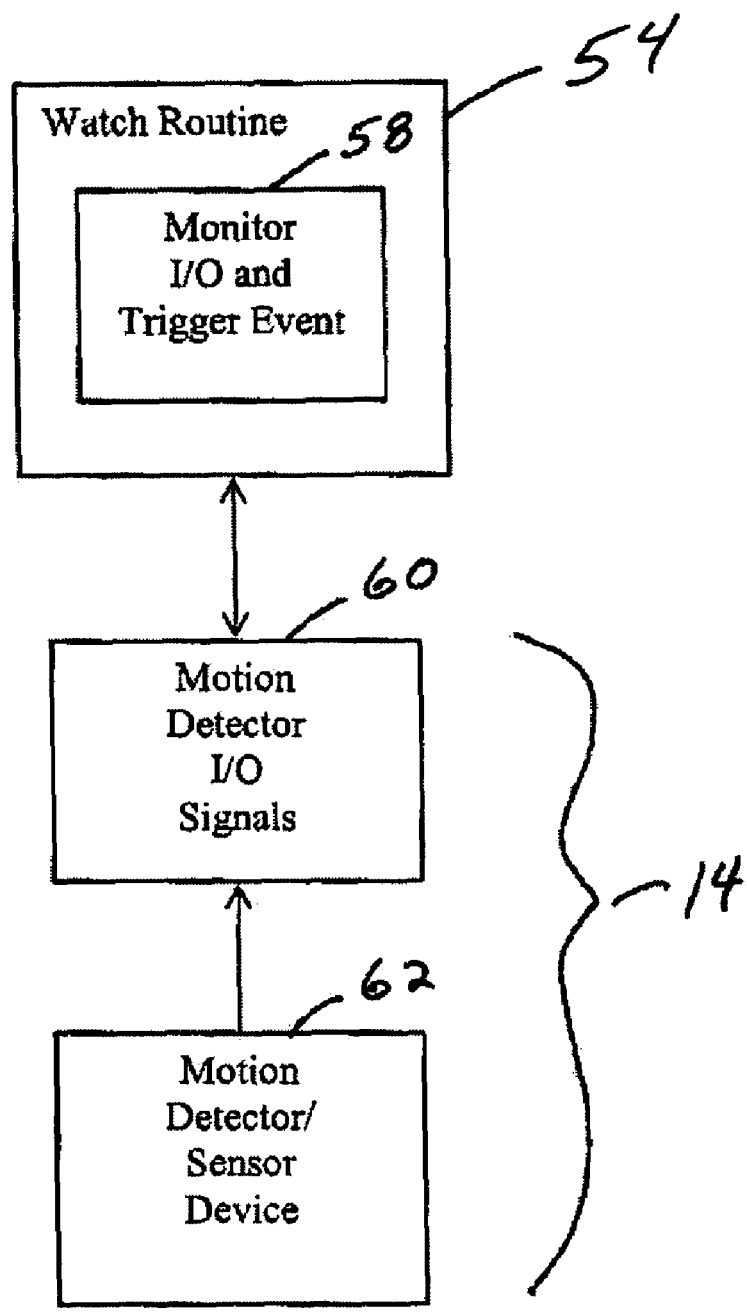
FIG. 4 is a diagrammatic representation of the watch routine of the system routines of FIG. 2 and operably coupled to the motion detection system of the exemplary bird deterrent system of FIG. 1.

In FIG. 4, the watch routine 54 of the forced activation routine 44 and its associated motion detection subsystem 14 are shown. The watch routine 54 thus monitors via the motion detection subsystem 14 whether an animal is within a motion detection area (i.e. whether physical detection of an animal has occurred). To this end, the motion detection subsystem 14 includes a motion detector/sensor device 62 such as an infrared sensor and interposing I/O signal hardware 60. The watch routine 54 thus includes an I/O monitor and event trigger routine 58. Detection of an animal triggers playing of an audio file and/or impactor activation. It should be appreciated that the motion detector/sensor device 62 may be any type of active or passive sensor that can determine physical presence of an animal.

Figure 5:
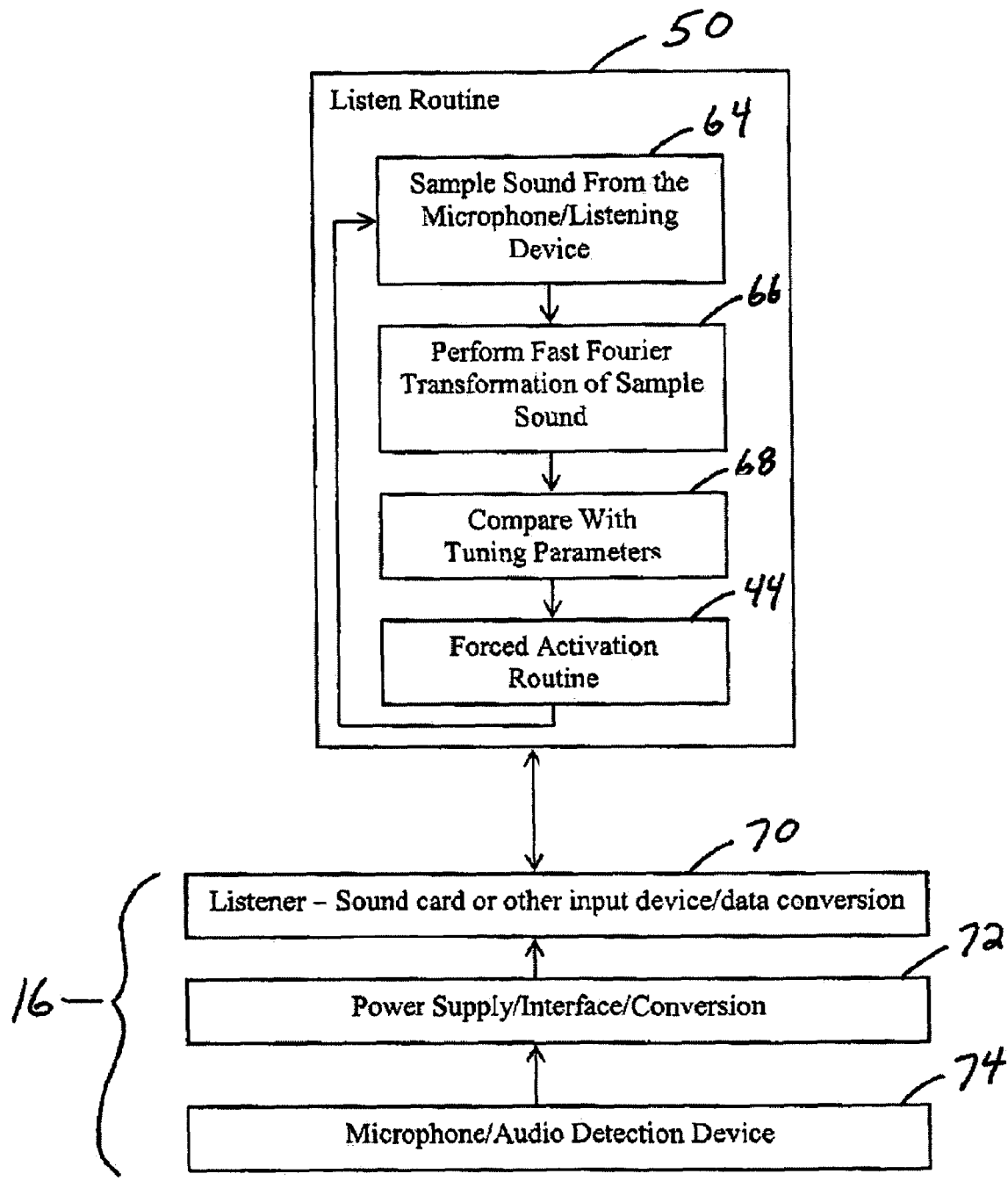
FIG. 5 is a diagrammatic representation of the listen routine of the system routines of FIG. 2 and operably coupled to the audio detection system of the exemplary bird control system of FIG. 1.

In FIG. 5, the listen routine 50 of the forced activation routine 44 and its associated audio detection subsystem 16 are shown. The listen routine 50 thus monitors a listening area via the audio detection subsystem 16 to determine/detect whether animal noises or sounds are present within an audio detection area. With respect to birds for example, the system can determine various species. The audio detection subsystem 16 thus includes a microphone or other audio/sound detection device 74 (collectively, microphone) for receiving sounds. The microphone 74 may be coupled through a power supply/interface converter 72 to a sound card or other input device/data converter 70 to the computer 12.

The listen routine 50 samples sound from the microphone 64. Particularly, the system captures a sound sample from the microphone 74. Thereafter, the system converts the time based sample to a frequency based sample using Fast Fourier Transformation (FFT) techniques 66. The frequency based sample is compared to user configurable (tuning) parameters 68. This allows the system to be tuned to specific species and to compensate for loud/busy installation environment background noise. The forced activation routine 44 is invoked thereafter if appropriate. Tuning of the parameters may include tuning of 1) lower frequency, i.e. the lowest frequency of the target species or desired analysis range; 2) upper frequency, i.e. the highest frequency of the target species or desired analysis range; 3) threshold, i.e. the minimum level used to distinguish input sounds from background sounds; and 4) number of peaks, i.e. how many peaks in the selected range are present in the signal. Preferably, sound sampling is turned off if the system is actively generating deterrent sounds. This eliminates feedback in the system as well as mistaken detection where target sounds are part of the deterrent composition.

Figure 6:
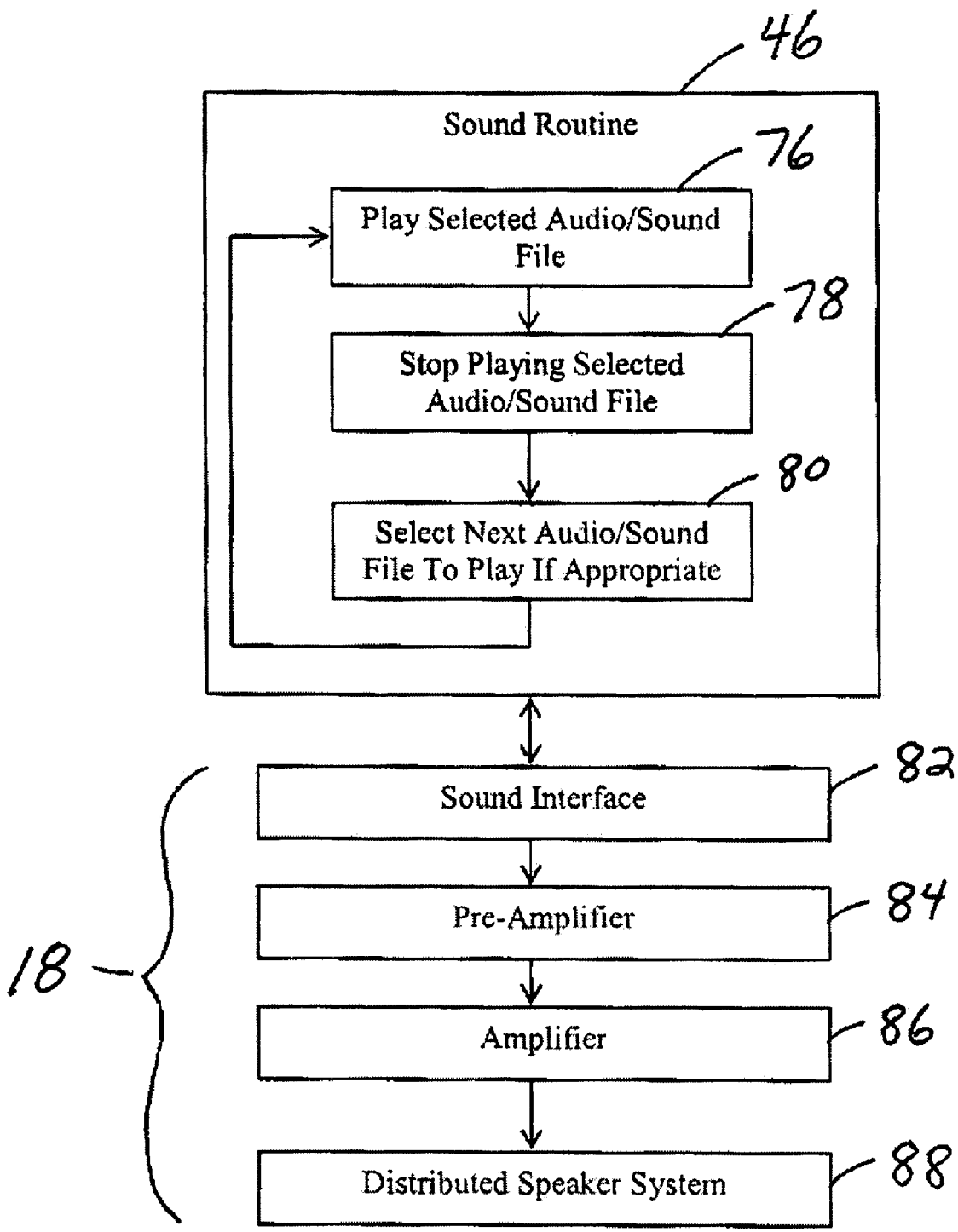
FIG. 6 is a diagrammatic representation of the sound routine of the system routines of FIG. 2 and operably coupled to the audio output system of the exemplary bird control system of FIG. 1.

The system routines 32 further includes a sound routine 46 that is operable to select and play the predator and/or deterrent sound audio files 34 either in response to a forced activation (detected animal), a timer file, or manual activation. In FIG. 6, the sound routine 46 is illustrated with the accompanying audio output subsystem 18. The sound routine 46 initially plays a selected audio/sound file 76. After a predetermined period of time (duration), the system ceases playing of the selected audio/sound file 78. Thereafter, a next selected audio/sound file 34 is played if appropriate 80. If not played, the next selected (preferably randomly from the plurality of audio/sound files) is stored for next playing. The sound file to play can be incremented manually through the GUI 30 or is randomly selected after a deterrent sound is force activated or automatically activated through the timer file. This creates a randomness to prevent patterns that may cause challenging.

The audio output subsystem 18 includes a speaker or speaker array 88 (collectively, speakers). The speakers 88 are coupled to and receives audio signals from an amplifier 86 that, in turn, is coupled to and receive audio signals from a pre-amplifier 84 (if necessary). The amplifiers are connected to a sound card 82 that provides an interface with the computer 12. The speakers 88 are placed strategically to direct sound in the area of desired deterrence. The speakers 88 play the selected sounds and provide acoustic energy. Preferably, 70V audio distribution systems are used to reduce environmental interference with the deterrent sound. Armored or shielded cabling is used to reduce distortion or environmental impact to the sound signals. Installation may be mounted within conduit runs. The power amplifier (such as a Crown CT210 or similar unit) provides volume/attenuation controls. Multiple speaker systems may also be used. Optionally, the power amplifiers may have automatic shut offs when not in use to reduce power draw and heat generated in the system housing.

The system routines 32 also includes an impact routine 48 that is operable to cause an impact, percussion, strike, blow or the like against a large metal structure to which the impactor is mounted resulting in a loud audible noise or whack. Particularly, the impact subsystem 20 is operable to simulate the presence of humans (human presence) by mimicking the action of someone hitting a structure with a bat, pole, rod, hammer, rock and/or the like. This is accomplished by an impact device or impactor 98 that is connected to a structure 99 as further explained below.

Figure 7:
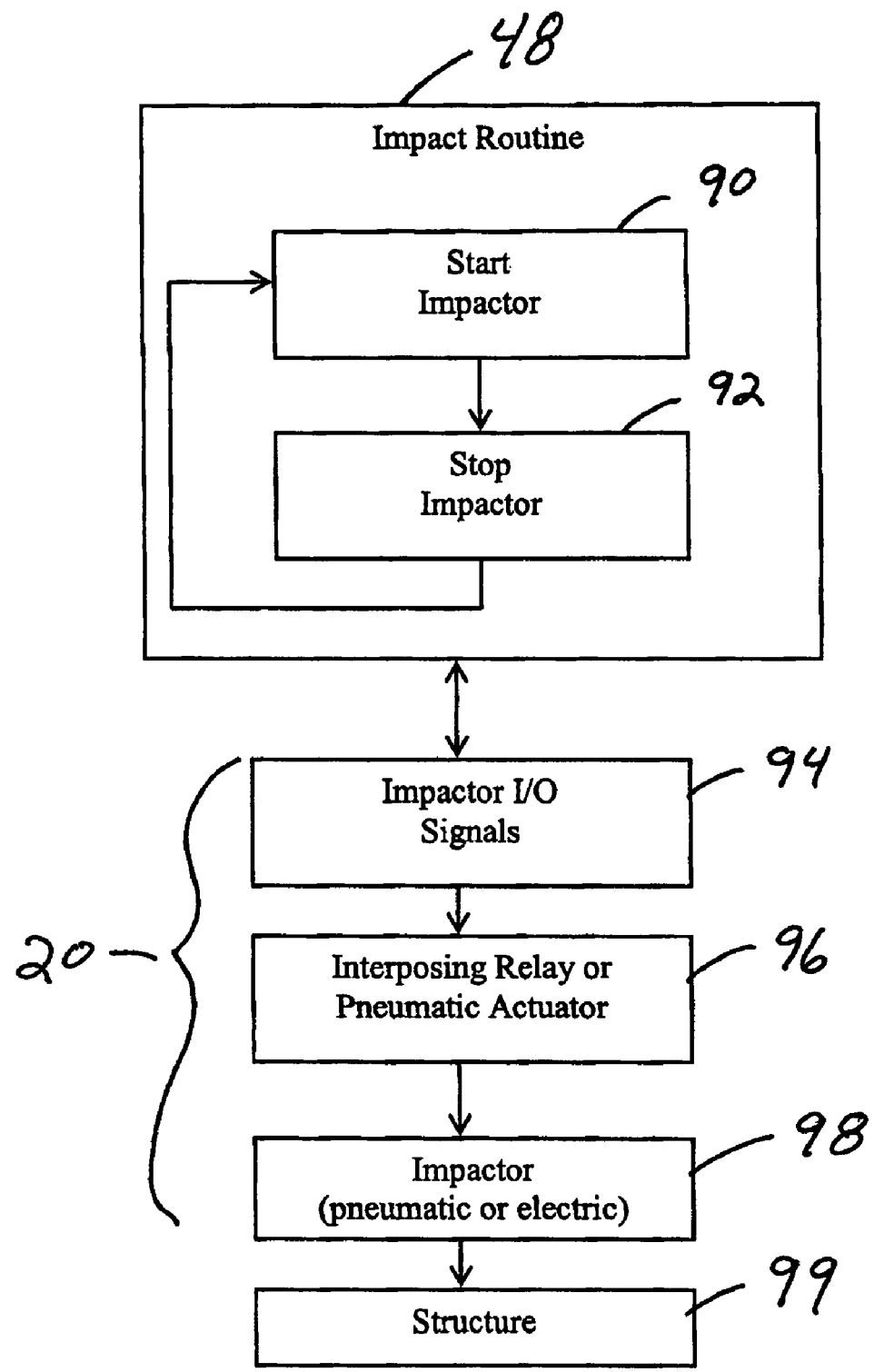
FIG. 7 is a diagrammatic representation of the impact routine of the system routines of FIG. 2 and operably coupled to the impactor system of the exemplary bird control system of FIG. 1.

In FIG. 7, the impact routine 48 is depicted connected to the impact subsystem 20. The impact routine 48 is activated by a timer file or via the forced activation routine. Essentially, the impact routine provides for starting or activating the impactor 98 (start impactor 90) and for stopping or de-activating the impactor 98 (stop impactor 92). The impact subsystem 20 to which the impact routine 48 applies and/or controls, includes the impactor 98 that is connected to the computer 12 for control thereof via an interposing relay, pneumatic actuator, solenoid or the like 96 (actuator) depending on the form of the impactor 98. A digital I/O device for interpreting I/O signals 94 between the computer 12 and the interposing actuator and impactor 98 is provided to connect the computer 12 to the impact subsystem 20 for operation thereof. This may be a USB connected I/O device such as a Measurement Computing minilab. The interposing relay or pneumatic actuator is needed to convert computer I/O, such as TTL, for use by the actuator 96.

When activated, that is, during an impactor activation or "on" duration (impactor duration), the impactor 98 is controlled so as to provide an impact, strike, thump, hit, impulse, impingement, whomp, blow, stroke, whack, knock, rap or the like (collectively, impact) against the structure to which it is mounted in intervals of preferably once approximately every seven (7) to ten (10) seconds. While this impact interval, impact rate or impact repetition rate may have a lower end that is less than seven (7) seconds and/or an upper end that is greater than (10) seconds, it has been found that the seven (7) to ten (10) second impact rate is optimal for simulating a human presence. Typically, the impact duration is from between thirty-five (35) seconds to one (1) minute.

Thus, when the impactor 98 is activated for an impact duration, the impactor is intermittently actuated to provide an impact at the impact rate. Thus, if the impactor is on for an impact duration of thirty-five (35) seconds and the impact rate is seven (7) seconds, the impactor 98 will be actuated five (5) times (35÷7). The impact rate, however, may not be constant during the impact duration and thus may be varied during the impact duration. This prevents the resulting impact noise from becoming periodic such that a bird may become accustomed to the noise.

The impactor 98 provides an impact force or a magnitude of impact against the structure of between ten (10) to sixty-five (65) pounds and preferably between fifty (50) and sixty-five (65) pounds. Too little of an impact force and there won't be a loud enough noise generated. Too much of an impact may compromise the integrity of the structure, particularly over repeated impacts. The range of impact force, however, may differ depending on the dimensions of the structure as well as its composition. The preferred range of impact force is for a typical eight (8) to ten (10) inch steel I-beam or support pole such as are found in electrical substations. Thus, the impactor 98 may provide an impact force of less than fifty (50) pounds on a smaller structure, and greater than sixty-five (65) pounds on a much larger structure.

As indicated above, the impactor 98 may be a pneumatic impactor or an electric impactor. A suitable pneumatic impactor is a Martin Thumper Timed Impactor available from Martin Engineering of Neponset, Ill. If a pneumatic impactor is used, the impact subsystem 20 would include a compressed air supply and the actuator would be an air valve or pneumatic actuator. The valve would be actuated by control signals to provide the desired impact rate. Another pneumatic impactor that may be used is a pneumatic piston vibrator available from VIBCO of Wyoming, R.I. The VIBCO pneumatic piston vibrator is variable in its vibrations speed such that a vibration may occur only three (3) to six (6) times a minute. The impact force of the vibration at this rate provides an impact rather than a vibration.

In the case of an electric impactor 98, suitable impactors are one or more of the SCR-Electric line of vibrators available from VIBCO of Wyoming, R.I. The SCR-Electric line of vibrators provides for adjustable vibration speed from 0–4000 RPM and adjustable force from 0–1000 pounds (impact force) depending on the particular model (see www.vibco.com). A suitable and preferable model is the SCR-60 which has an adjustable vibration speed of 0–4000 RPM and an adjustable impact force up to sixty (60) pounds. In this case, the actuator will be a solenoid that is controllable by the computer 12.

When the SCR-60 is adjusted to within a range of three (3) to six (6) vibrations per minute, an impact repetition rate of from once every twenty (20) seconds to once every ten (10) seconds is provided. The impact force may be the maximum sixty (60) pounds.

In the case that the present system 10 is installed in an electrical substation, the impactor 98 is preferably connected to a beam or support pole of an electrical transformer. The dimensions of the support pole of an electrical transformer are adequate to provide the needed sound performance from the impact by the impactor 98. An impact thus produces a noise that may then produce reverberations.

In all cases, the impactor 98 is connected to a large structure such as an I-beam, pole or the like that is roughly four or more inches in diameter and/or which creates a substantial noise or percussion when whacked (impacted). The larger the structure the better since a larger structure produces a more vibrant sound when impacted.

Figure 8:
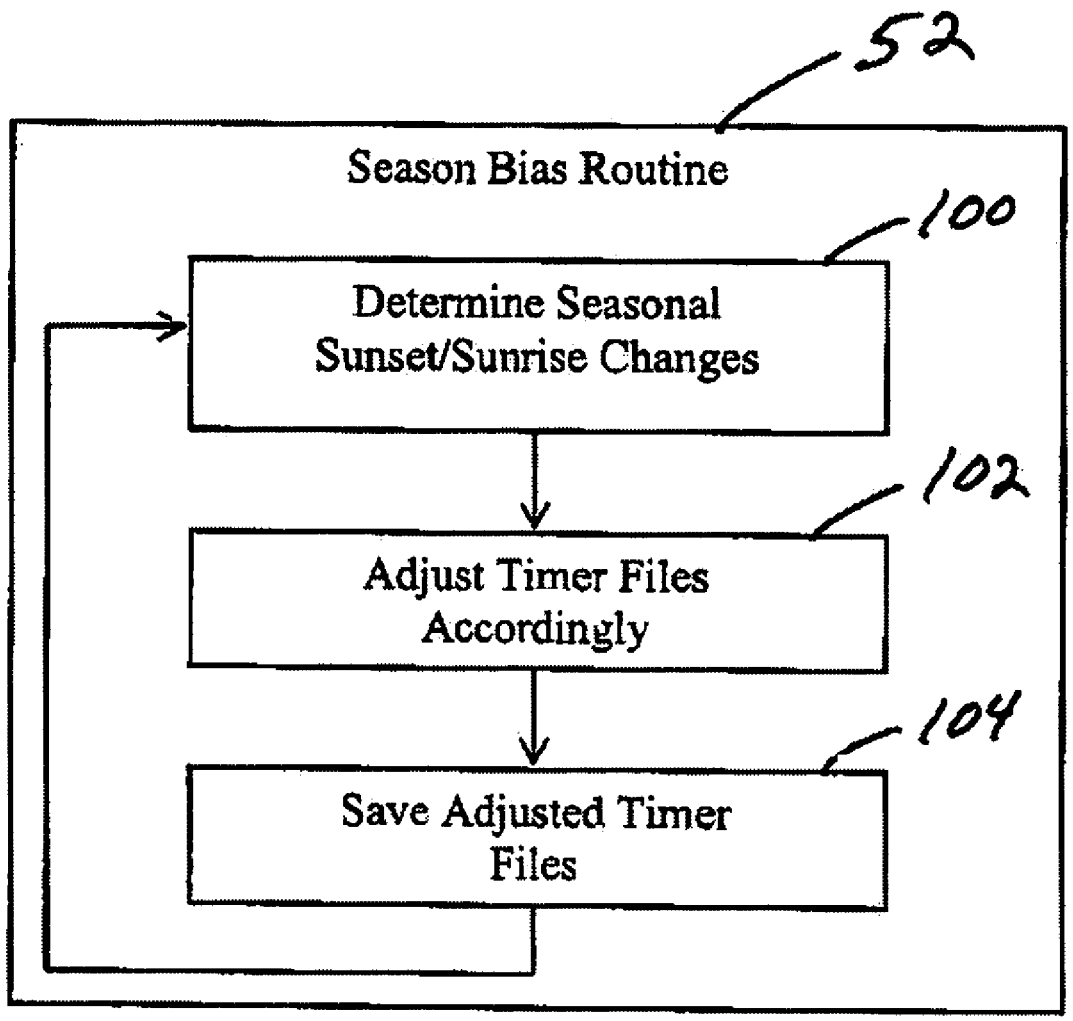
FIG. 8 is a diagrammatic representation of the seasonal bias routine of the system routines of FIG. 2.

Referring back to FIG. 2, the system routines 32 also next includes the listen routine 50 that has been discussed above with reference to the forced activation routine 44. Lastly, the system routines 32 includes a season bias routine 52. The season bias routine 32 increments and/or decrements each timer file in the system each day to account for the change in sunrise and/or sunset due to seasonal changes, particularly with respect to installation location. Referring to FIG. 8, the season bias routine 52 is particularly shown. The season bias routine 52 determines seasonal sunset/sunrise changes 100 depending on the location of installation. Thereafter, the timer files are adjusted accordingly 102. The adjusted timer files are then saved 104.

Referring now to FIG. 10, an exemplary GUI 30 is depicted. It should be appreciated that the GUI 30 is only exemplary of the many ways in which a GUI may be configured and/or to operate within the principles of the present invention. The GUI 30 is shown with a timer file 138 displayed thereon. In addition to typical "windows" based icons, the GUI 30 includes an icon 120 that allows the user (either via a mouse or key) to add a timer to the timer file 138. An icon 122 allows the user (either via a mouse or key) to delete a timer. Icons 124 and 126 allow the user (either via a mouse or key) to increment and decrement respectively, in hours the start time and/or any highlighted timer file parameter. Icons 128 and 130 allow the user (either via a mouse or key) to increment and decrement respectively, in minutes the start time and/or any highlighted timer file parameter. Icon 132 allows the manual selection (either via a mouse or key) of audio file sequence from the plurality of audio files. Icon 134 allows the manual activation (either via a mouse or key) of an audio file for testing. Icon 136 allows manual activation (either via a mouse or key) of the impactor for testing.

GUI 30 also includes an automatic seasonal time adjustment area 150 for enabling and/or disabling the seasonal bias routine. A detection monitoring area 148 is provided for enabling and/or disabling the automatic animal detection routines. Thus, the system 10 may utilize both automatic animal control via the timer files and the forced activation animal control via the detection subsystems. Moreover, a forced activation area 140 allows user modification of the duration of the audio file to play 142 (in seconds) and/or the duration of the impactor to activate 144 after animal detection (forced activation).

The GUI 30 also shows the active sound either playing or next in queue and the number of active audio files in the system. As well, output status is shown. Other parameters area also evident. The GUI 30 also shows the parameters of the loaded timer file. Particularly, the number of each timer of the timer file is shown adjacent the start time of the audio file (sound), the duration in seconds of the audio file to be played ("Duration"). Additionally the length of activation of the impactor in seconds ("Impact") is depicted. All of these parameters are user adjustable. Once a timer has been played, another randomly or programmed audio file is selected for next playing as appropriate for the next timer start time. As seen, the impactor does not necessarily activate with each timer.

The present system 10 or at least some components thereof may be provided in a housing. The following is an exemplary housing configuration for at least portions of the present system 10. Other housing configurations are thus contemplated. The housing may include a rack mount amplifier bracket, a removable mid shelf for mounting the peripheral devices, power distribution or power strip, microphone power/adaptor, external speaker terminal block, and external I/O device with interposing relay as needed. The housing may also include an upper shelf (such as on a slide tray for in and out movement/access) that holds a laptop computer and optionally the external computer speakers to allow interfacing with the volume/balance controls. In order to allow the upper drawer/shelf to move in and out, all of the wiring between the laptop, computer speakers, the power amplifier, digital I/O device, microphone, other detection devices, and/or power cords are stress relieved on the back panel. Wires are routed optimally to separate sound wires from power wires.

The housing is typically open from the front (the entire front panel being hinged to allow access thereto) and mounted on a wall optimally elevated to provide ergonomic access to components of the system. Moreover, the housing provides air flow paths to direct air flow across the components/electronics thereof. This may be accomplished by forced draft fan, penetrations or louvers in the housing to allow air exchange. Air may be drawn through the front panel/door through perforations with or without an air filter media and then out side panel louvers of the lower housing assembly. Other configurations to provide adequate air flow may be provided and are contemplated.

Variations of the present system 10 are also contemplated. Particularly, the computer 12 (being a laptop or otherwise) may be connected to a battery backup power supply for uninterruptible power. The system may also include a solar power unit. Various detection systems such as sonic, infrared, heat, motion, radar, trip wire and other common devices are also contemplated. Remote control access and/or control may be utilized for the various components of the system. The system 10 may also be connected to a network such as the Internet for remote access and/or control.

Of course, other configurations of a bird deterrent system and/or device are contemplated. The various embodiments of the subject bird deterrent system presented herein and thus fashioned in accordance with the present invention are only exemplary of the many bird deterrent configurations that may utilize the principles of the present invention.

A preferred embodiment of the system 10 includes bird control software and the computer hardware to run the same as described herein, wherein a base unit includes a housing, laptop computer, power amplifier, preamplifier/external computer speaker, power distribution/power strip, adaptors/cables/fittings for connecting these devices, software installation and computer I/O interface devices for the subsystem components. At least one speaker is provided for the audio output subsystem, typically mounted at a roosting/intrusion site. A microphone sensing subsystem including a multi-directional microphone, power supply, means for detection, and the audio sensor placed to reduce feedback but produce deterrent sounds. The timer sequence includes start time, duration of sounds and/or impact duration programmed relative to a target intrusion time (for example, roosting time/sunset), several timers provided for before and after sunset or other optimal times. Lastly, the system includes an impactor programmed to correlate with any, all or none of the deterrent sounds.

While the invention has been illustrated and described in detail in the drawings and foregoing description, the same is to be considered as illustrative and not restrictive in character, it being understood that only preferred embodiments has been shown and described and that all changes and modifications that come within the spirit of the invention are desired to be protected.

What is claimed is:

1. A bird control apparatus comprising:
   a computer;
   an audio output subsystem connected to said computer and operable to play audio;
   an audio file stored on said computer and operable to be played on said audio output subsystem upon receipt of an audio actuation signal from said computer;
   an impactor connectable to a structure and operable to intermittently impact the structure with an impact force so as to create an audible noise upon receipt of an impact actuation signal from said computer; and
   a timer file stored on said computer and containing an audio output parameter operable to provide said audio actuation signal to said audio file play and an impactor parameter operable to provide said impact actuation signal to said impactor upon execution of said timer file by said computer.

2. The bird control apparatus of claim 1, wherein said audio output parameter comprises an audio output playing duration, and said impactor parameter comprises an impactor actuation duration.

3. The bird control apparatus of claim 2, wherein said impactor is operable to intermittently impact the structure with an impact force once every seven to ten seconds within said impactor actuation duration.

4. The bird control apparatus of claim 3, wherein said impactor actuation duration is between 35 seconds and one minute.

5. The bird control apparatus of claim 1, wherein said impactor is operable to intermittently impact the structure with an impact force of between ten and sixty pounds.

6. The bird control apparatus of claim 1, further comprising:
   a graphic user interface executable on said computer and operable to modify said audio file parameter and said impactor parameter of said timer file.

7. The bird control apparatus of claim 1, further comprising:
   an audio input subsystem connected to said computer and operable to receive bird noises from an audio detection area and determine species of bird from the bird noises by sampling the bird noise, performing a fast Fourier transform of the sampled bird noise, and comparing the fast Fourier transform to various audio parameters.

8. The bird control apparatus of claim 1, further comprising:
   a seasonal bias routine operable to adjust start time of the timer file in accordance with a change in sunrise and/or sunset.

9. A bird control system comprising:
   a computer;
   an audio input subsystem connected to said computer and operable to receive bird noises from an audio detection area and determine species of bird from the bird noises by sampling the bird noise, performing a fast Fourier transform of the sampled bird noise, and comparing the fast Fourier transform to various audio parameters;
   a bird deterrent timer file stored on said computer and containing a bird deterrent start time and a bird deterrent duration; and
   a bird deterrent subsystem connected to said computer;
   wherein said computer is programmed to utilize said bird deterrent timer file to activate said bird deterrent subsystem at said bird deterrent start time and for said bird deterrent duration.

10. The bird control system of claim 9, wherein said computer is further programmed to adjust said bird deterrent start time of said timer file for changes in sunrise and/or sunset.

11. The bird control system of claim 9, wherein said bird deterrent subsystem comprises an impactor subsystem.

12. The bird control system of claim 9, wherein said bird deterrent subsystem comprises an audio file subsystem including a bird deterrent audio file playable on said audio file subsystem.

13. The bird control system of claim 9, wherein said computer is programmed via a graphical user interface.

14. A bird control method comprising:
 providing a computer;
 providing an audio input subsystem connected to said computer that is operable to receive bird noises from an audio detection area;
 determining species of bird from the bird noises by sampling the bird noise, performing a fast Fourier transform of the sampled bird noise, and comparing the fast Fourier transform to various audio parameters;
 storing bird deterrent timer file on said computer, said bird deterrent timer file containing a bird deterrent start time and a bird deterrent duration;
 providing a bird deterrent subsystem connected to said computer; and
 utilizing said bird deterrent timer file to activate said bird deterrent subsystem at said bird deterrent start time and for said bird deterrent duration.

15. The bird control method of claim 14, further comprising:
 adjusting said bird deterrent start time of said timer file for changes in sunrise and/or sunset.

16. The bird control method of claim 14, wherein said bird deterrent subsystem comprises an impactor subsystem.

17. The bird control method of claim 14, wherein said bird deterrent subsystem comprises an audio file subsystem including a bird deterrent audio file playable on said audio file subsystem.

* * * * *